May 7, 1929.  A. MOORHOUSE  1,712,459
MOTOR VEHICLE
Filed Dec. 14, 1925
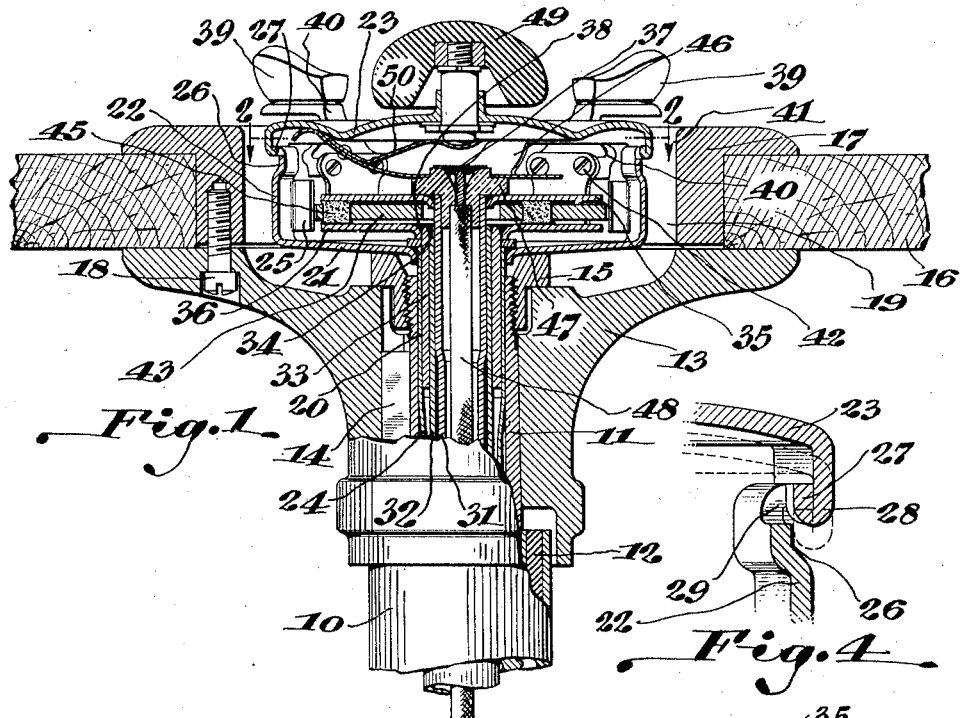
Fig.1
Fig.4
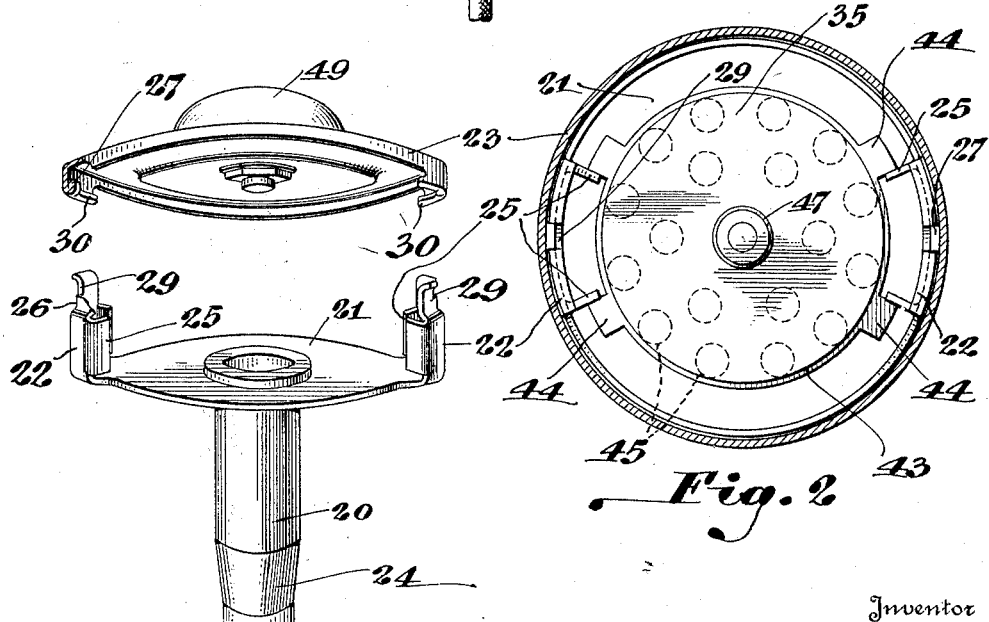
Fig.3
Fig.2
Inventor
Alfred Moorhouse
By Milton Tibbetts
Attorney Patented May 7, 1929.

1,712,459

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed December 14, 1925. Serial No. 75,225.

This invention relates to motor vehicles and particularly to the steering and control mechanism thereof.

One of the objects of the invention is to provide a simple and accessible control mechanism on the steering wheel of a motor vehicle.

Another object of the invention is to provide a steering mechanism in which the control devices are mounted in a depression in the steering wheel in such manner that they will be readily accessible and so that part of the enclosing housing may be readily removed for inspection or repair.

Another object of the invention is to provide a novel form of housing means for control connections supported on the steering wheel.

The above and other objects of the invention will appear from the following description taken in connection with the drawing, which forms a part of this specification, and in which:

Fig. 1 is a view mostly in section of a steering wheel and control mechanism of a motor vehicle embodying the invention;

Fig. 2 is a transverse section substantially on the line 2—2 of Fig. 1, with the spring element removed;

Fig. 3 is a view of the two parts of the housing for the mechanism, the parts being shown disconnected and with parts broken away to illustrate the construction more clearly, and Fig. 4 is an enlarged detail sectional view of the housing parts.

In the drawing, for the purpose of convenience, a steering mechanism is illustrated as set in a vertical position. Usually the steering mechanism of a motor vehicle is set at an angle and sometimes the axis of the gearing is set very near to the horizontal, but the position thereof is immaterial so far as the present invention is concerned. It will be understood, however, that the terms "upper" and "lower" are relative merely, as used in this specification.

Referring to the drawing, 10 represents the stationary part of a steering column, which is adapted to be suitably mounted on the frame or other part of a motor vehicle so that the steering arm which projects from the steering column at its lower end may be connected to the steering wheels of the vehicle and so that the upper end may be arranged conveniently for the driver or operator. The steering column itself is a stationary part and in it is mounted a steering post 11. This post is in the form of a tube and there is a suitable bearing 12 for the post at the upper end of the tube, as shown in Fig. 1.

The upper or free end of the steering post 11 is enlarged somewhat for the reception of the steering wheel, and as shown herein, this upper enlarged part is made of a separate piece 13. This part 13 is keyed to the steering post 11 as by a key 14 and nut 15 threaded on the end of the post 11.

The enlarged part 13 of the steering post forms a support for a steering wheel 16, the hub only of which is shown in Fig. 1. The wheel shown is of wood and it is arranged to be clamped to the part 13 by a clamping ring 17 which may be made in two segmental parts or sections and removably secured to the part 13 by several bolts 18, one only of which is shown in Fig. 1.

The steering wheel or upper end of the steering post as thus constructed is formed with a recess or cylindrical depression 19, in its upper face. This depression is for the purpose of receiving the motor control devices and their housing so that those parts will not extend above the plane of the steering wheel itself and so that the whole will present a neat and attractive appearance.

The housing for the motor control devices is in the form of a tube 20, a plate 21 secured to the upper end of the tube 20, arms 22 oppositely disposed and extending upwardly from the plate 21, and the cover 23 which is detachably secured to the plate portion or arms 22 as will be more particularly described hereinafter. The tube 20 fits with a suitable bearing in the upper end of the steering post 11 and then is contracted as shown at 24. It will be understood that the tube 20 is so supported at its lower end that it remains stationary or does not turn with the steering post 11.

The arms 22 are each provided with inturned flanges forming lugs 25 for a purpose hereinafter described. The upper end of each arm 22 is bent to form an external or circumferential channel 26 to receive a lug 27 formed on a downwardly extending arm 28 on the cover 23. There are two of these arms 28 oppositely disposed on the cover 23, as particularly shown in Figs. 1 and 3. Each of the arms 22 has a notch 29 cut into its upper end as shown particularly in Figs. 3 and 4, and the lug 27 after following along in the channel 26 until it reaches this notch 29, may then be moved upwardly in the notch to thereby prevent further turning of the cover. Each of the arms 28 is also formed with an inturned flange 30 which is arranged to enter the channel 26 and retain the cover in place.

From the above description it will be seen that the cover 23 may be connected to the plate 21 by dropping it over the plate with its arms 28 out of register with the arms 22 of the plate and then turning the cover so that its lugs 27 and flanges 30 will move in the channels 26 until the lugs 27 reach the notch 29. If the cover is then pushed upwardly, as by spring means hereinafter described, it will be prevented from moving circumferentially by reason of the interlocking engagement of the lug 27 and the notch 29. The cover may be removed by pressing it downwardly and disengaging this lug and notch and turning the cover so that the flange 30 and channel 26 are disengaged.

Referring again to the housing for the motor control devices arranged in the recess 19 in the steering wheel, it will be seen that there are two tubes 31 and 32, one within the other, and both mounted within the tube 20, above described. The upper ends of these tubes extend above the plate 21 and their upper ends are slightly enlarged so that the inner tube 31 may have a bearing in the upper end of the tube 32 and the latter may have a bearing in the upper end of the tube 20. The enlargement of the tube 32 is formed by a sleeve 33 which is welded or otherwise secured to it as at 34. The tubes preferably extend entirely through the tubular member 20 and at their lower ends they are adapted to connect with the throttle valve and spark control, or to other suitable motor control mechanism.

At their upper ends the tubes 31 and 32 are provided with separated disks or plates 35 and 36 respectively, the disk 35 being welded or otherwise secured to the tube 31 as at 37, and the disk 36 being welded or otherwise secured to the tube 32 as at 38. Each of these disks is provided with an operating handle 39, the shank 40 of which extends through the slot 41 between the cover 23 and the portion 17 of the steering wheel, for connection to its respective disk, screws 42 being shown for thus connecting the operating handles to the disks. It will be understood that the handles 39 may be moved about the axis of the steering post to rotate the tubes 31 and 32 to thereby control the various devices of the motor. Arranged between the disks 35 and 36 is a friction disk or plate 43 which is held against turning movement by radially projecting ears 44 arranged on either side of the inturned flanges or lugs 25 on the arms 22, these lugs being a part of the stationary housing. The disk 43 has numerous cork inserts 45 arranged in openings in the disk and projecting slightly on both sides thereof.

A spring 46 arranged between the disk 35 and the upper wall or cover 23 of the housing yieldingly presses the disks 35 and 36 in frictional contact with the corks of the disk 43 so that the tubes 31 and 32 to which the disks 35 and 36 are respectively connected are frictionally retained against turning movement and thus the motor control devices are held in their set positions. It will be seen that the spring 46 rests against the plug 47 which is inserted in the upper end of the tube 31 and rests against the disk 35, instead of the spring being in direct contact with the disk 35. This plug is preferably of fibre or other insulation material and carries the upper end of an insulated wire 48 which extends through the tube 31 and out of its lower end. This wire is adapted for connection to the electric horn and a battery, the other side of the battery being grounded on the frame of the vehicle and consequently on the steering column 10. For sounding the horn it is only necessary to ground the wire 48 and this is accomplished by a push button 49 mounted in an opening at the middle of the upper face of the cover 23. A spring 50, connected to the spring 46, retains the button 49 in its upper or inoperative position and by pressing the button downwardly against the action of the spring 50, the latter, which is grounded on the steering column, makes contact with the upper end of the wire 48, thus closing the horn circuit.

From the above described arrangement of the spring 46 it will be understood that the cover 23 is retained in its upper position by this spring with the lugs 27 in the notches 29 and thereby the cover 23 is retained against rotary movement on the plate 21. By pressing the cover against the action of the spring 46, as shown in dotted lines in Fig. 4, the cover may then be turned until the flanges 30 are entirely out of the channels 26 when the cover, and with it the push button 49, may be lifted off and thereby expose the interior of the housing. Repairs to the control devices within the housing may then be made and the cover replaced by pressing it down against the action of the spring 46, turning it until the lugs 27 register with the notches 29 and then releasing it so that the spring 46 moves it upwardly until it reaches the position shown in full lines in Fig. 1.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a steering wheel having a depression therein, control devices in the depression, a housing for said control devices, said housing being formed in two parts connected by a bayonet joint and means within the housing for locking the joint.

2. In a motor vehicle, the combination of a steering wheel having a depression therein, of a bracket supported in said depression, a cover for said bracket, means interconnecting the cover and bracket permitting removal of the cover while the bracket is within said depression and means intermediate the cover and bracket for locking the interconnecting means.

3. In a control mechanism for motor vehicles, the combination of a support, control devices therefor including a wire terminal and contact point, a cover for said support having a bayonet joint therein, and a spring device for making contact with said contact point and for retaining said cover in position.

4. In a control mechanism for motor vehicles, the combination of a tubular support, a plate secured to the end thereof, control devices extending through said tube and having means for hand controls at the ends thereof, arms on said plate, and a cover for said plate having readily detachable means connecting it with said arms.

5. In a control mechanism for motor vehicles, the combination of a supporting tube, a plate secured to the end of said tube and having upturned oppositely disposed arms, said arms having inturned flanges forming lugs, control devices extending through said tube and having friction plates at their upper ends, and a friction disk arranged between the plates of said devices and having means cooperating with said lugs to hold said friction disk against turning.

6. In a motor vehicle, the combination of a steering wheel having a central depression therein, a stationary supporting tube extending through the steering wheel and having a plate arranged in said depression, control devices extending through said tube and having arms at their upper ends extending upwardly in said depression and outwardly over the steering wheel, and a cover for said support having a readily detachable connection with said plate so that the cover may be removed while the plate and control devices are in said depression in the steering wheel.

7. In a motor vehicle the combination of a steering wheel having a depression therein, a support in the depression, a cover for the support and a spring pressed means interconnecting the support and cover.

8. In a motor vehicle, the combination of a steering wheel having a depression therein, a support in the depression, a cover for the support, means interconnecting the support and cover and a spring intermediate the support and cover for retaining the interconnecting means in a locked position.

In testimony whereof I affix my signature.

ALFRED MOORHOUSE.